United States Patent [19]

Nakayama et al.

[11] Patent Number: 4,830,474

[45] Date of Patent: May 16, 1989

[54] VARIABLE MAGNIFICATION OPTICAL SYSTEM

[75] Inventors: Hiroki Nakayama; Yasuhisa Sato, both of Kanagawa; Kouji Oizumi, Tokyo; Yasuyuki Yamada, Kanagawa, all of Japan

[73] Assignee: Canon Kabushiki Kaisha, Tokyo, Japan

[21] Appl. No.: 934,914

[22] Filed: Nov. 25, 1986

[30] Foreign Application Priority Data

Dec. 12, 1985 [JP] Japan .................................. 60-280058
Dec. 12, 1985 [JP] Japan .................................. 60-280061

[51] Int. Cl.$^4$ ...................... G02B 15/02; G02B 13/18; G02B 9/14
[52] U.S. Cl. ................................... 350/422; 350/432; 350/475
[58] Field of Search ................. 350/422, 464, 432, 475

[56] References Cited

U.S. PATENT DOCUMENTS

| | | | |
|---|---|---|---|
| 4,394,071 | 7/1983 | Yamada | 350/422 |
| 4,422,734 | 12/1983 | Tanaka et al. | 350/422 |
| 4,596,447 | 6/1986 | Yamada et al. | 350/422 |
| 4,634,235 | 1/1987 | Fujioka | 350/422 |
| 4,728,179 | 3/1988 | Hayashi et al. | 350/422 |

Primary Examiner—John K. Corbin
Assistant Examiner—Ronald M. Kachmarik
Attorney, Agent, or Firm—Fitzpatrick, Cella, Harper & Scinto

[57] ABSTRACT

A changeover type variable magnification optical system whose focal length is changed by locating an auxiliary lens on the image side of a master lens assembly. The system satisfies following inequalities of:

$$0.2 < f_2/f_1 < 0.71$$

where $f_1$ and $f_2$ are the effective focal lengths of the master lens assembly and the auxiliary lens, respectively. The auxiliary lens is constructed include of at least one aspherical lens surface.

9 Claims, 21 Drawing Sheets

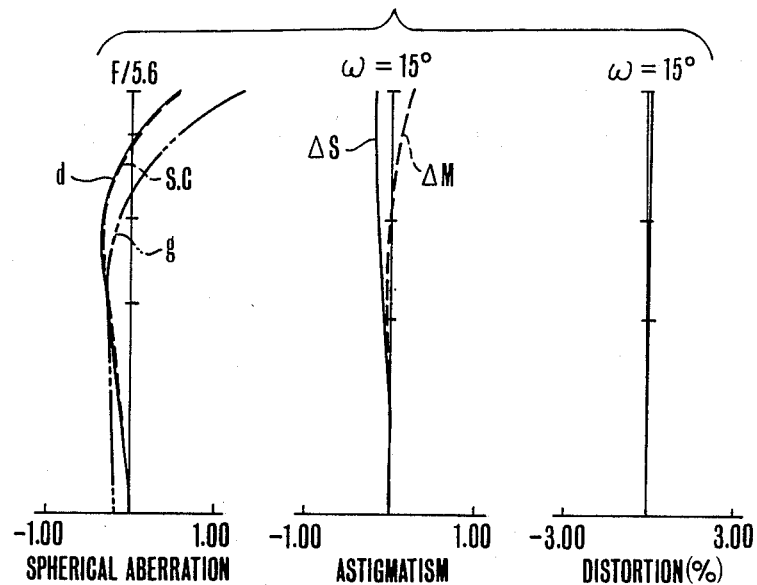
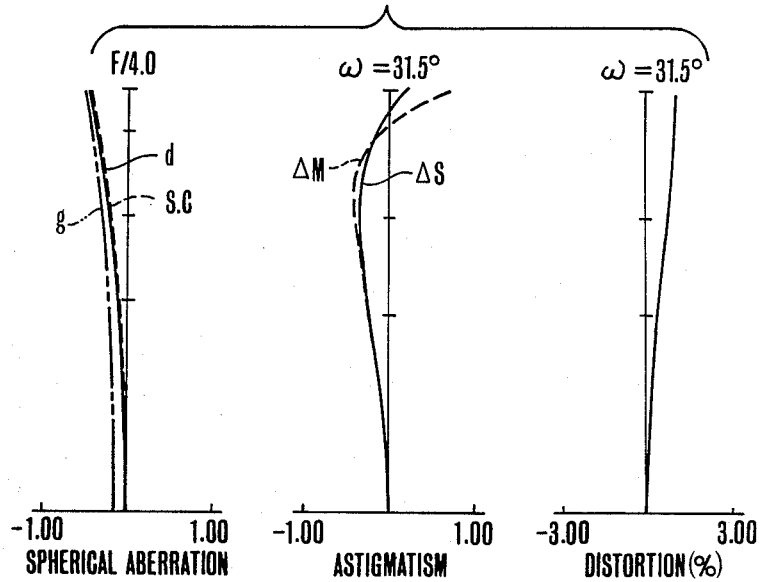

VARIABLE MAGNIFICATION OPTICAL SYSTEM

BACKGROUND OF THE INVENTION

1. Field of the Invention

This invention relates to changeover type variable magnification optical systems, and more particularly to changeover type variable magnification optical systems with an auxiliary lens removably located on the image side of a master lens assembly to decrease the focal length of the entire system. Still more particularly it relates to the increasing the magnification change ratio with the limitation of the size to a minimum, while still maintaining high stability of good performance against the change of magnification to be achieved so that the optical system is suited to photographic cameras or video cameras.

2. Description of the Related Art

There have been proposed a wide variety of variable magnification optical systems of the changeover type using an auxiliary lens, or so-called conversion lens, upon releasable attachment to the master lens assembly in front, or in rear, thereof to change the focal length of the entire system, while maintaining constant the position of the focal plane of the entire system. Of these, the front attachment of the conversion lens to the master lens assembly, or the so-called front conversion method, tends to increase the diameter of the conversion lens. Therefore, the use of it has made it difficult to achieve minimization of the size of the entire system.

The rear attachment of the conversion lens to the master lens assembly, or the so-called rear conversion method, on the other hand, though being more advantageous at reducing the lens diameter than the front conversion method, requires an increase in the necessary number of lens elements. Otherwise, the difficulty of aberration correction would increase. Hence, the use of it has tended to increase the length of the entire lens system in the longitudinal direction.

In Japanese Laid-Open Patent Application No. SHO 59-29214, as the rear conversion lens, use is made of a positive lens for the purpose of changing the focal length of the entire system to a shorter value. Thus, it claims a wide angle conversion lens.

The optical system employing such a wide angle conversion lens has, however, its ratio of magnification change set to as small a value of less than 2. Also, to attach the conversion lens, the master lens assembly must be positioned ahead. Hence, this conventional optical system tends to increase in size.

In order to heighten the ratio of magnification change with minimizing of the size of the entire system, it is in the general case that the refractive power of the conversion lens is strengthened. Yet, this method has a drawback that when the conversion lens is used, the amount of aberrations produced increases. Particularly spherical aberration and coma are affected largely. As the Petzval sum also increases, the difficulty of properly correcting the curvature of field increases.

SUMMARY OF THE INVENTION

A first object of the invention is to employ the rear conversion method in a changeover type variable magnification optical system, while still permitting a minimization of the bulk and size of the entire system to be achieved.

A second object under the first object is to provide a changeover type variable magnification optical system of increased range while still maintaining good imaging performance to be achieved.

Under the above-described object, the following condition is satisfied:

$$0.2 < f_2/f_1 < 0.71$$

where $f_1$ and $f_2$ are the focal lengths of the master lens assembly and the auxiliary lens, respectively.

The system is also so constructed that when the auxiliary lens is in use, the following condition is satisfied:

$$2.0 < f_1/F < 4.0$$

where F is the overall focal length of the master lens assembly and the auxiliary lens.

Another feature of the invention is that aspheric sphere is applied to at least one of the lens surfaces constituting the auxiliary lens. In a specific embodiment of the invention, the aspherical surface is formed to such a shape that as the height from the optical axis increases, the positive power becomes progressively weaker.

BRIEF DESCRIPTION OF THE DRAWINGS

FIGS. 1(A) to 5(B) and FIGS. 12(A) to 16(B) are longitudinal section views of examples 1 to 5 and 6 to 10 of specific lenses of the invention, respectively.

FIGS. 6(A) to 10(B) are graphic representations of the aberrations of the lenses of FIGS. 1(A) to 5(B), respectively.

FIGS. 17(A) to 21(B) are graphic representations of the aberrations of the lenses of FIGS. 12(A) to 16(B), respectively.

Note, in the longitudinal section views, FIGS. 1(A), 2(A), 3(A), 4(A), 5(A), 12(A), 13(A), 14(A), 15(A) and 16(A) illustrate the master lens assemblies, FIGS. 1(B), 2(B), 3(B), 4(B), 5(B), 12(B), 13(B), 14(B), 15(B) and 16(B) illustrate the master lens assemblies plus the auxiliary lenses, where I denotes the master lens assembly, and IL denotes the auxiliary lens.

In the aberration curves, FIGS. 6(A), 7(A), 8(A), 9(A), 10(A), 17(A), 18(A), 19(A), 20(A) and 21(A) illustrate the aberrations of the master lens assemblies, and FIGS. 6(B), 7(B), 8(B), 9(B), 10(B), 17(B), 19(B), 20(B) and 21(B) illustrate the combined aberrations of the master lens assemblies and the auxiliary lenses, where ΔM is the meridional image surface, ΔS is the sagittal image surface, d is the spectral d-line, and g is the spectral g-line.

DETAILED DESCRIPTION OF THE PREFERRED EMBODIMENTS

Figure 1A:
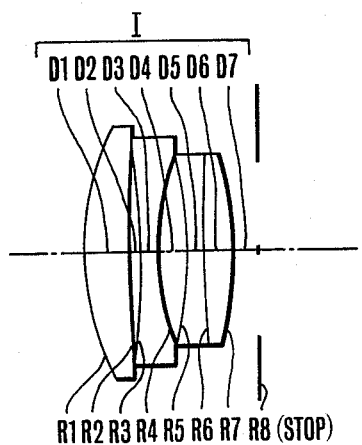
Figure 1B:
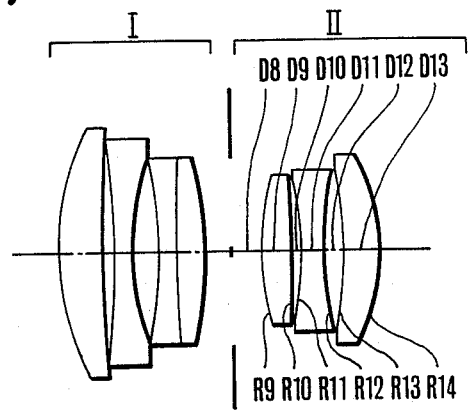
Figure 2A:
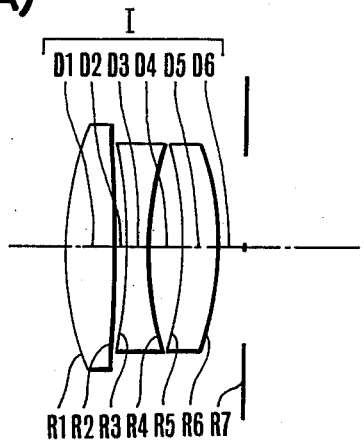
Figure 2B:
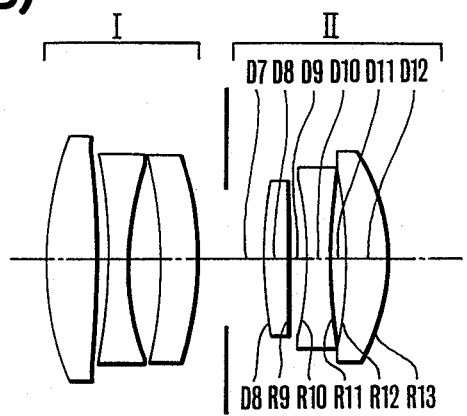
Figure 3A:
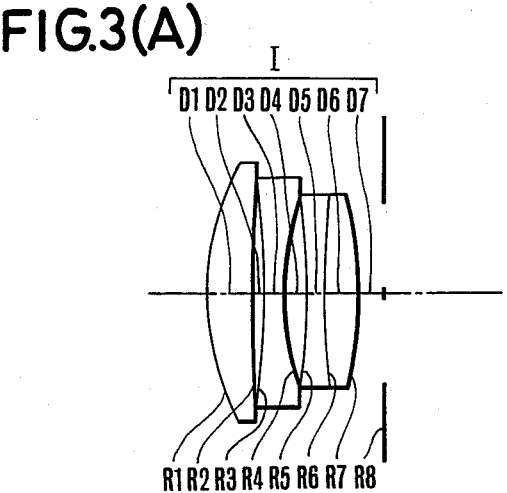
Figure 3B:
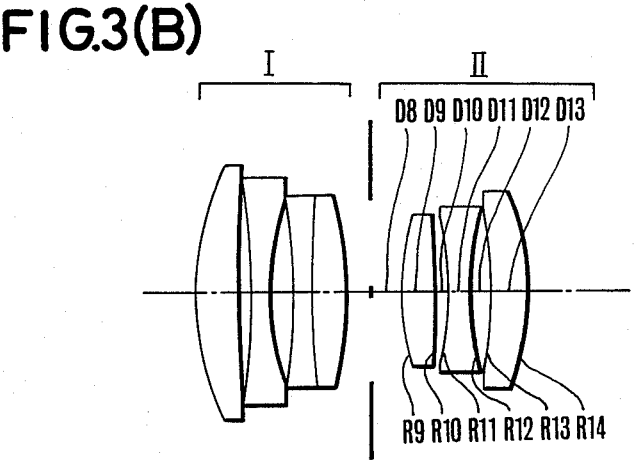
Figure 4A:
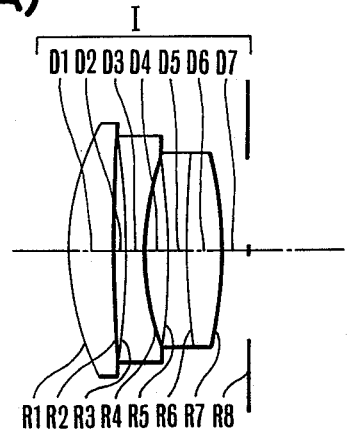
Figure 4B:
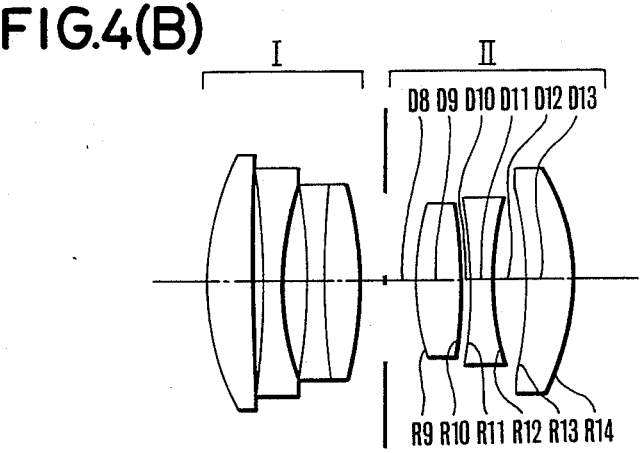
Figure 5A:
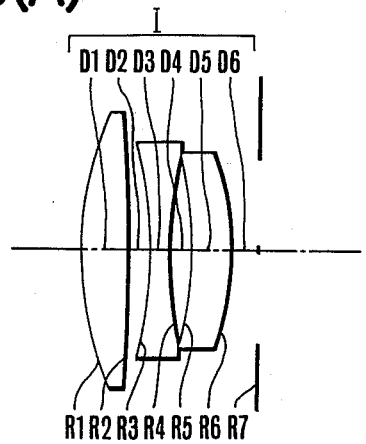
Figure 5B:
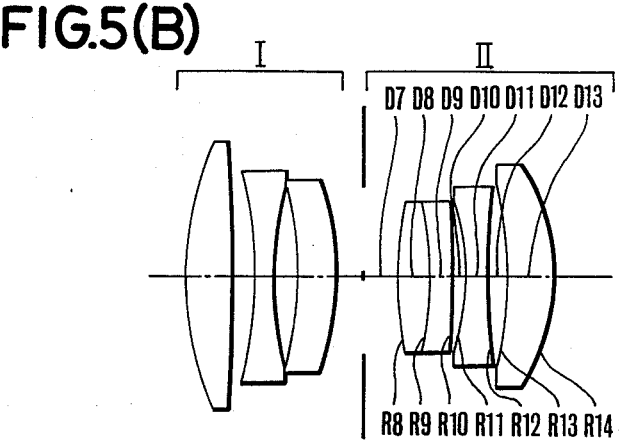
Figure 6A:
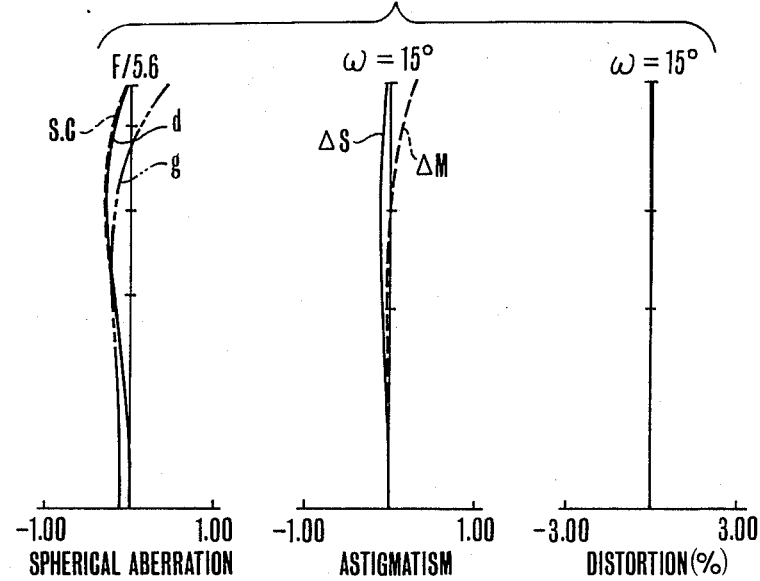
Figure 6B:
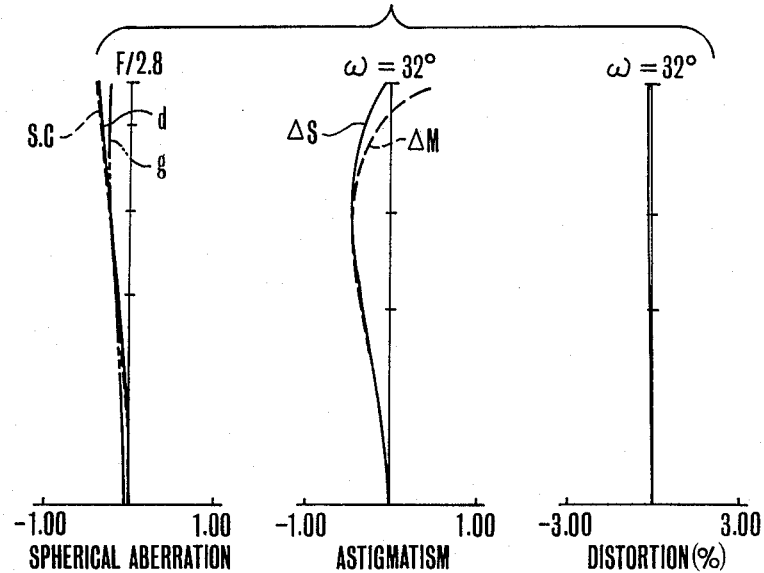
Figure 7A:
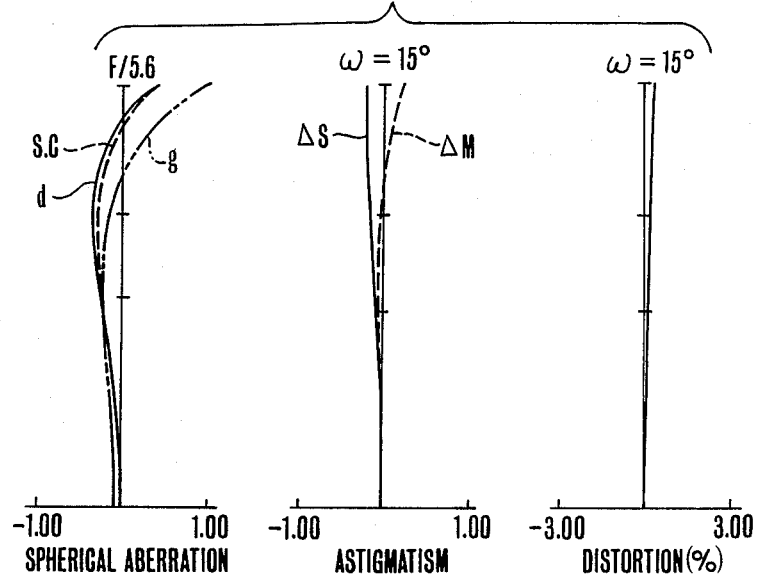
Figure 7B:
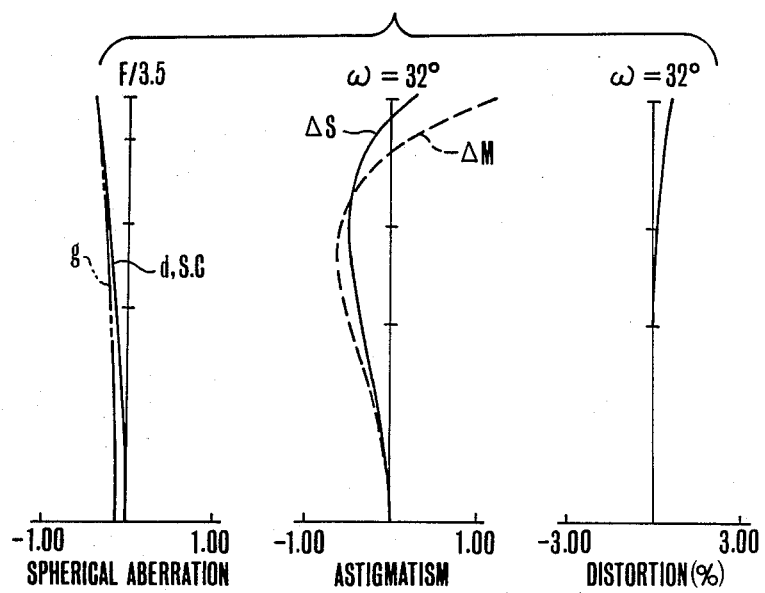
Figure 8A:
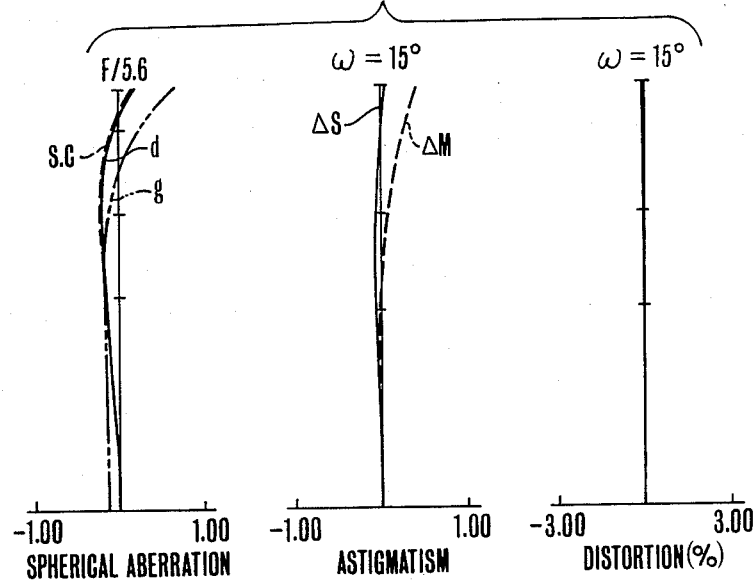
Figure 8B:
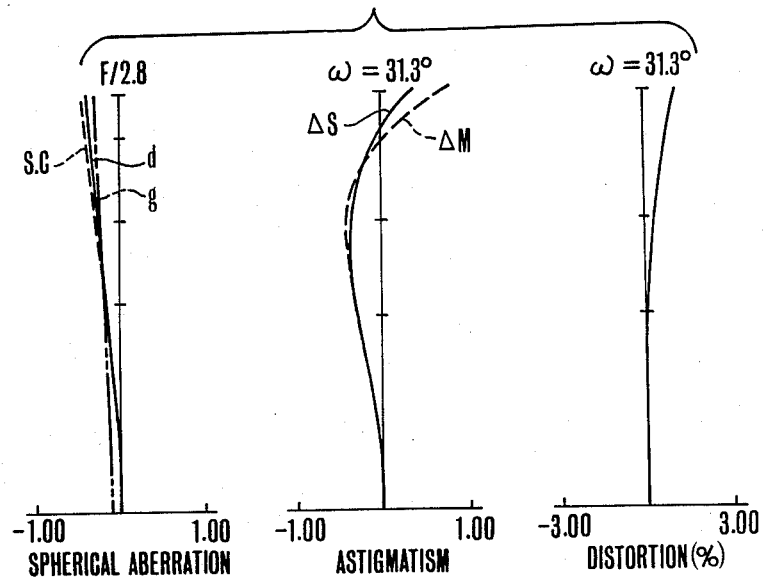
Figure 9A:
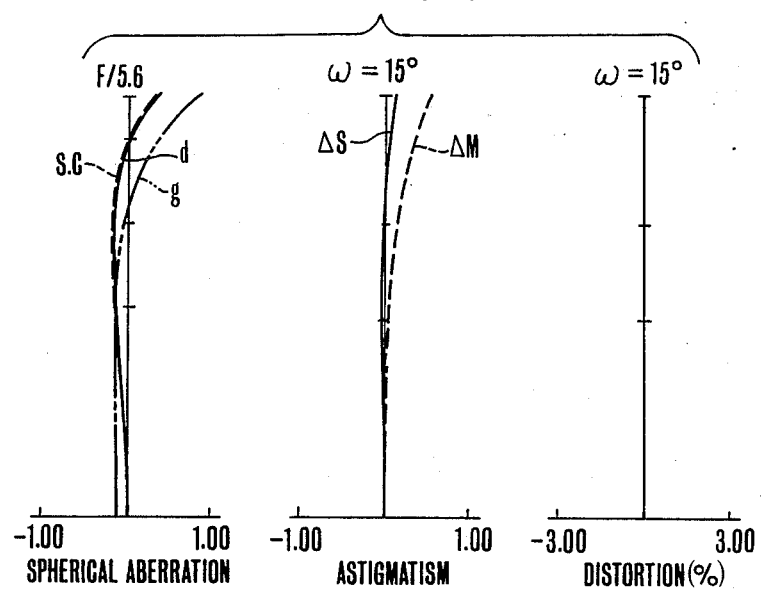
Figure 9B:
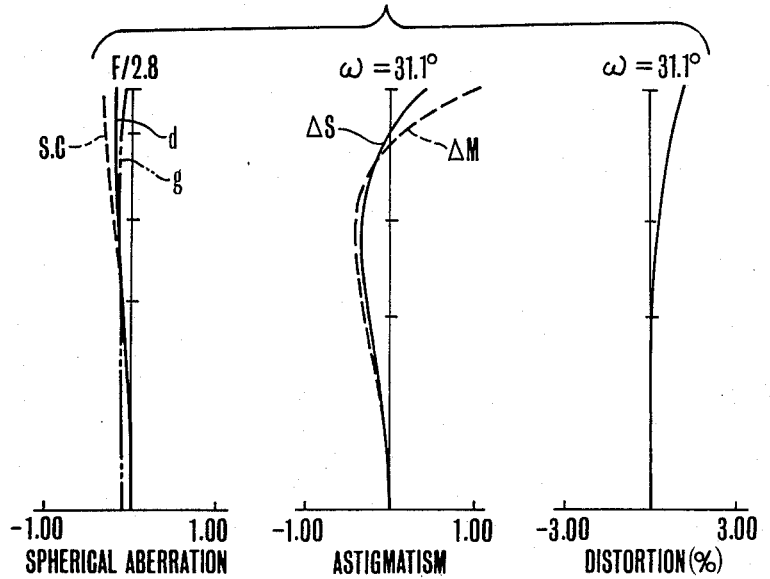
Figure 10A:
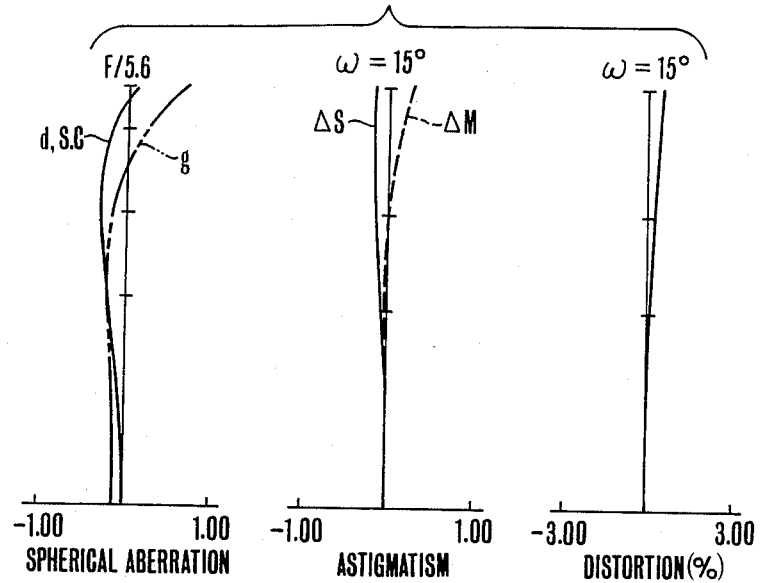
Figure 10B:
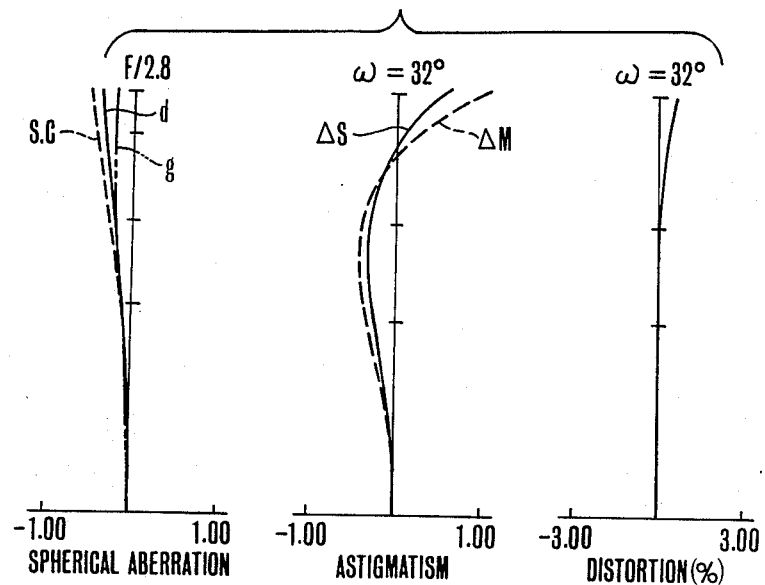

Five examples of an embodiment of the changeover type variable magnification optical system according to the present invention are shown in FIGS. 1(A) to 5(B) with FIGS. 1(A), 2(A), 3(A), 4(A) and 5(A), each being the master lens assembly I alone, and FIGS. 1(B), 2(B), 3(B), 4(B) and 5(B), each being the master lens assembly I had the auxiliary lens II in combination, as the latter is attachable to the image side of the former.

In this embodiment, for, as the master lens assembly and the auxiliary lens both have positive powers, the focal length F of the entire system, when the auxiliary lens is in use, changes to a shorter value, the following condition is set forth:

$$0.2 < f_2/f_1 < 0.71 \tag{1}$$

where $f_1$ and $f_2$ are the focal lengths of the master lens assembly and the auxiliary lens, respectively.

Also, in the specific examples to be described later, in order to maintain good correction of aberration which is stable against the change of the image magnification, the following second condition is set forth:

$$2.0 < f_1/F < 4.0 \tag{2}$$

where F is the overall focal lengtn of the master lens assembly and the auxiliary lens.

If a master lens assembly and an auxiliary lens are so designed that their refractive powers fall within the range defined by the inequalities (1), improved results are attained such that the ratio of magnification change is increased to more than 2, and, nevertheless, the range of variation of the aberration before and after the change of the magnification is minimized to achieve good correction of aberrations in both focal length positions.

In more detail, letting the refractive power of the master lens assembly be denoted by $P_1 (=1/f_1)$, and the refractive power of the auxiliary lens by $P_2 (=1/f_2)$, the equation for their combined refractive power $P (=1/F)$ is given by the following expression:

$$P = P_1 + P_2 - eP_1P_2 \tag{A1}$$

where e is the interval between the principal points of the master lens assembly and the auxiliary lens. Here, in the embodiment of the invention, by putting $P_1/P_2 = f_2/f_1 < 0.71$, and $0 < P_1 < < 1$, the ratio of magnification change takes a higher value than 2.

When the refractive power of the auxiliary lens is so much weakened as to excess the upper limit of the enequalities of condition (1), the ratio of magnification change becomes insufficient. When it is so much strengthened as to exceed the lower limit, the desired increase in the ratio of magnification change is sufficiently assured, but the variation of the aberrations with the change of magnification, particularly field curvature, is increased objectionably.

Also, in this embodiment, a compromise between the requirements of increasing the ratio of magnification change and of stabilizing the good correction of aberrations against the magnification change sets forth the inequalities of condition (2).

When the ratio of the magnification change is increased beyond the upper limit of the inequalities of condition (2), a large variation of aberrations, particularly too large an increase of the Petzval sum, results from the attachment of the auxiliary lens to the master lens assembly. So, it becomes very difficult to preserve good correction of image aberrations. The violation of the lower limit implies that no valuable increase in the ratio of magnification change from the value heretofore attained is achieved.

In order to achieve good correction of image aberrations particularly in the marginal zone of the picture format when the auxiliary lens is in use, it is preferred in this embodiment that this auxiliary lens is constructed from a first lens component of positive power in the form of a bi-convex singlet or cemented doublet, a second lens component in the bi-concave form, and a third component of positive power in the meniscus form convex toward the rear.

Further, it order that the aberrations of the master lens assembly alone and those of the combined system with the auxiliary lens are corrected in good balance, it is preferred in this embodiment that this master lens assembly is constructed from a first lens component of positive power, a second lens component of negative power, and a third lens component in the form of a singlet of positive power or a doublet of positive power consisting of negative and positive lenses cemented together, satisfying the following condition:

$$0.1 < L_1/f_1 < 0.24 \tag{3}$$

where $L_1$ is the distance from the front vertex of the first lens component to the rear vertex of the third lens component.

When the physical length of the master lens assembly is too long in relation to the refractive power thereof beyond the upper limit of the inequalities of condition (3), the diameter of the front lens members becomes unduly large. Thus, the entire lens system becomes bulkier and heavier. Moreover, large off-axis aberrations are produced. When the physical length is too short beyond the lower limit, the number of lens elements must be decreased with an increase in the refracting power of each lens surface. Therefore, large higher order aberrations are produced. Thus, it becomes difficult to properly correct image aberrations over the entire area of the format.

In order to minimize the Petzval sum of the entire lens system in either focal length position so that good stability of field curvature correction is maintained, the Petzval sum of the common part, that is, the master lens assembly must first be minimized. For this purpose, it is better to define the ranges of refractive indices $N_P$ and $N_N$ of the positive and negative lenses of the master lens assembly, respectively, as follows:

$$N_p > 1.7 N_N < 1.7 \tag{4}$$

The overall Petzval sum PS of the master lens assembly and the auxiliary lens may be expressed by the following equation:

$$PS = P_1/N_{11} + P_2/N_{12}$$

where $N_{11}$ and $N_{12}$ are the mean refractive indices of the master lens assembly and the auxiliary lens, respectively. Hence, because the choice of a condition: $P_2 > P_1 > 0$ has advantages on the aberration correction, for the Petzval sum of the combined system of the master lens assembly and the auxiliary lens is minimized, it is better to further introduce the following rule of design:

$$N_{11} < N_{12} \tag{5}$$

As for the diaphragm, it is preferred in this embodiment to arrange an aperture stop in between the master lens assembly and the auxiliary lens with the advantage that the image aberrations are corrected in good balance over the entire area of the format. Focusing is preferably performed by moving the master lens assembly either in part or as a whole, because the change of the focal length of the entire system does not require that the total focusing movement be altered. This enables the operating mechanism to be constructed in simple form.

Five examples of specific optical systems of the invention can be constructed in accordance with the numerical data given in the following tables for the radii of curvature, R, the axial thicknesses or air separations, D, and the refractive indices, N, and Abbe numbers, $\nu$, of the glasses of the lens elements with the subscripts numbered from front to rear. In these tables, I and II represent the master lens assembly and auxiliary lens respectively. The values of the focal length, f-number and image angle of the master lens assembly alone are also listed.

Numerical Example 1

Master Lens Assembly + Auxiliary lens
F = 36  FNO = 1:2.8  2ω = 61.95°

|   | R | D | N | ν |
|---|---|---|---|---|
| I | R1 = 20.36 | D1 = 3.27 | N1 = 1.77250 | ν1 = 49.6 |
|   | R2 = 125.92 | D2 = 0.83 | | |
|   | R3 = −62.98 | D3 = 1.31 | N2 = 1.62588 | ν2 = 35.7 |
|   | R4 = 20.63 | D4 = 1.94 | | |
|   | R5 = −40.78 | D5 = 1.43 | N3 = 1.57099 | ν3 = 50.8 |
|   | R6 = 84.88 | D6 = 2.35 | N4 = 1.77250 | ν4 = 49.6 |
|   | R7 = −27.19 | D7 = 1.77 | | |
|   | R8 = Stop | D8 = 2.20 | | |
| II | R9 = 19.99 | D9 = 2.35 | N5 = 1.834 | ν5 = 37.2 |
|   | R10 = −102.15 | D10 = 0.63 | | |
|   | R11 = −27.45 | D11 = 1.47 | N6 = 1.71736 | ν6 = 29.5 |
|   | R12 = 21.62 | D12 = 1.64 | | |
|   | R13 = −31.01 | D13 = 2.75 | N7 = 1.69350 | ν7 = 50.3 |
|   | R14 = −15.26 | | | |

Master Lens Assembly:
$f_1 = 80$, FNO = 1:5.6, 2ω = 29.94°
$f_2/f_1 = 0.668$     $L_1/f_1 = 0.138$
$f_1/F = 2.245$

Numerical Example 2

Master Lens Assembly + Auxiliary Lens
F = 36  FNO = 1:3.5  2ω = 61.95°

|   | R | D | N | ν |
|---|---|---|---|---|
| I | R1 = 20.03 | D1 = 3.58 | N1 = 1.77250 | ν1 = 49.6 |
|   | R2 = −101.27 | D2 = 0.75 | | |
|   | R3 = −33.67 | D3 = 1.38 | N2 = 1.62588 | ν2 = 35.7 |
|   | R4 = 22.89 | D4 = 2.22 | | |
|   | R5 = −27.60 | D5 = 2.77 | N3 = 1.81554 | ν3 = 44.3 |
|   | R6 = −19.46 | D6 = 1.77 | | |
|   | R7 = Stop | D7 = 2.39 | | |
| II | R8 = 23.91 | D8 = 2.05 | N4 = 1.83400 | ν4 = 37.2 |
|   | R9 = −73.17 | D9 = 1.08 | | |
|   | R10 = −21.60 | D10 = 1.39 | N5 = 1.69895 | ν5 = 30.1 |
|   | R11 = 28.12 | D11 = 1.33 | | |
|   | R12 = −26.66 | D12 = 2.81 | N6 = 1.77250 | ν6 = 49.6 |
|   | R13 = −14.46 | | | |

Master Lens Assembly:
$f_1 = 80.9$  FNO = 1:5.6  2·2ω = 29.94°
$f_2/f_1 = 0.655$     $L_1/f_1 = 0.132$
$f_1/F = 2.245$

Numerical Example 3

Master Lens Assembly + Auxiliary Lens
F = 35.6  FNO = 1:2.8  2ω = 62.57°

|   | R | D | N | ν |
|---|---|---|---|---|
| I | R1 = 20.60 | D1 = 3.28 | N1 = 1.77250 | ν1 = 49.6 |
|   | R2 = 127.73 | D2 = 0.97 | | |
|   | R3 = −60.21 | D3 = 1.35 | N2 = 1.62588 | ν2 = 35.7 |
|   | R4 = 20.49 | D4 = 1.79 | | |
|   | R5 = −39.22 | D5 = 1.39 | N3 = 1.57099 | ν3 = 50.8 |
|   | R6 = 57.97 | D6 = 2.71 | N4 = 1.77250 | ν4 = 49.6 |
|   | R7 = −26.93 | D7 = 1.77 | | |
|   | R8 = Stop | D8 = 2.19 | | |

-continued

|   | R | D | N | ν |
|---|---|---|---|---|
| II | R9 = 19.78 | D9 = 2.60 | N5 = 1.834 | ν5 = 37.2 |
|   | R10 = −103.02 | D10 = 0.83 | | |
|   | R11 = −26.64 | D11 = 1.47 | N6 = 1.71736 | ν6 = 29.5 |
|   | R12 = 21.09 | D12 = 1.67 | | |
|   | R13 = −30.68 | D13 = 3.01 | N7 = 1.69350 | ν7 = 50.3 |
|   | R14 = −14.88 | | | |

Master Lens Assembly:
$f_1 = 80.97$  FNO = 1:5.6  2ω = 29.92°
$f_2/f_1 = 0.652$     $L_1/f_1 = 0.142$
$f_1/F = 2.274$

Numerical Example 4

Master Lens Assembly + Auxiliary Lens
F = 35.8  FNO = 1:2.8  2ω = 62.27°

|   | R | D | N | ν |
|---|---|---|---|---|
| I | R1 = 20.86 | D1 = 3.20 | N1 = 1.77250 | ν1 = 49.6 |
|   | R2 = 111.01 | D2 = 0.97 | | |
|   | R3 = −59.76 | D3 = 1.37 | N2 = 1.62588 | ν2 = 35.7 |
|   | R4 = 21.10 | D4 = 1.77 | | |
|   | R5 = −41.64 | D5 = 1.44 | N3 = 1.57099 | ν3 = 50.8 |
|   | R6 = 57.82 | D6 = 2.77 | N4 = 1.77250 | ν4 = 49.6 |
|   | R7 = −27.22 | D7 = 1.77 | | |
|   | R8 = Stop | D8 = 2.20 | | |
| II | R9 = 20.52 | D9 = 3.32 | N5 = 1.834 | ν5 = 37.2 |
|   | R10 = −70.75 | D10 = 0.77 | | |
|   | R11 = −26.95 | D11 = 1.46 | N6 = 1.71736 | ν6 = 29.5 |
|   | R12 = 20.47 | D12 = 2.54 | | |
|   | R13 = −32.93 | D13 = 3.65 | N7 = 1.69350 | ν7 = 53.2 |
|   | R14 = −15.95 | | | |

Master Lens Assembly:
$f_1 = 82.00$  FNO = 1:5.6  2ω = 29.56°
$f_2/f_1 = 0.638$     $L_1/f_1 = 0.14$
$f_1/F = 2.29$

Numerical Example 5

Master Lens Assembly + Auxiliary Lens
F = 36.26  FNO = 1:2.8  2ω = 61.64°

|   | R | D | N | ν |
|---|---|---|---|---|
| I | R1 = 25.38 | D1 = 3.57 | N1 = 1.77250 | ν1 = 49.6 |
|   | R2 = −190.39 | D2 = 1.56 | | |
|   | R3 = −31.41 | D3 = 1.38 | N2 = 1.62588 | ν2 = 35.7 |
|   | R4 = 28.56 | D4 = 1.57 | | |
|   | R5 = −31.46 | D5 = 3.28 | N3 = 1.77250 | ν3 = 49.6 |
|   | R6 = −19.66 | D6 = 1.77 | | |
|   | R7 = Stop | D7 = 1.48 | | |
| II | R8 = 32.99 | D8 = 2.48 | N4 = 1.83400 | ν4 = 37.2 |
|   | R9 = −22.97 | D9 = 1.57 | N5 = 1.59551 | ν5 = 39.2 |
|   | R10 = −74.32 | D10 = 1.00 | | |
|   | R11 = −17.24 | D11 = 1.46 | N6 = 1.72825 | ν6 = 28.5 |
|   | R12 = 44.46 | D12 = 1.47 | | |
|   | R13 = −30.64 | D13 = 3.86 | N7 = 1.77250 | 7 = 49.6 |
|   | R14 = −14.44 | | | |

Master Lens Assembly:
$f_1 = 82.40$  FNO = 1:5.6  2ω = 29.44°
$f_2/f_1 = 0.612$     $L_1/f_1 = 0.138$
$f_1/F = 2.271$ Another embodiment of the invention is next described in which at least one of the lens surfaces constituting the auxiliary lens is made aspheric. FIGS. 12(A) to 16(B) show five specific examples of the embodiment of the changeover type variable magnification optical system according to the invention with FIGS. 12(A), 13(A), 14(A), 15(A) and 16(A) being longitudinal section views of the master lens assemblies I alone, and FIGS. 12(B), 13(B), 14(B), 15(B) and 16(B) being longitudinal section views of the auxiliary lens II attached to the master lens assemblies I. The auxiliary lens II is attachable to the image side of the master lens assembly I.

In this embodiment also, the master lens assembly I and the auxiliary lens II are both of positive power, and the focal length F of the entire system changes to a shorter value when the auxiliary lens II is attached.

This leads to a tendency of increasing the range of variation of the various aberrations with the change of the focal length of the entire system. Of these, the Petzval sum has positive values in both focal length positions. As a result, the field is curved in the negative direction in both focal length positions. Particularly when the auxiliary lens is attached, the Petzval sum increases largely in the positive direction, so that the curvature of field has a larger negative value.

To reduce the curvature of field, if the conventional method of increasing the total number of lens elements or of choosing an appropriate refractive index of glass for each lens element is employed, the bulk and size of the entire lens system would be increased objectionably and other difficult problems would arise.

For this reason, in the 6th to 10th specific optical systems of the invention, as the auxiliary lens comprises three lens components of the above-described forms, at least one of them is made aspherical with the advantage of improving the state of correction of field curvature along with other aberrations.

Figure 11A:
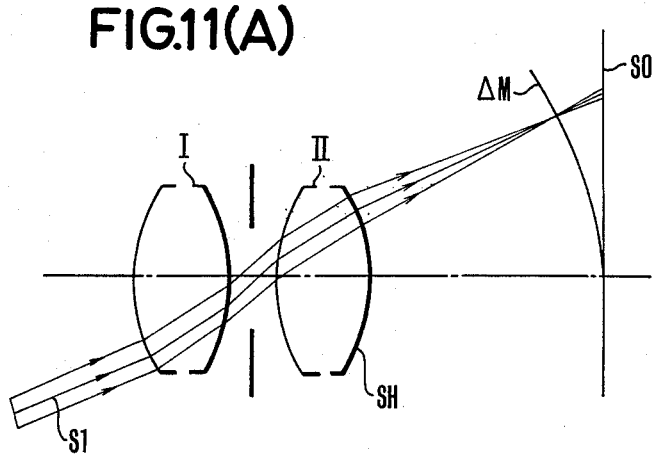
FIGS. 11(A) and 11(B) the diagrams of geometry taken to explain what effect the spherical surface of the invention produces.
Figure 11B:
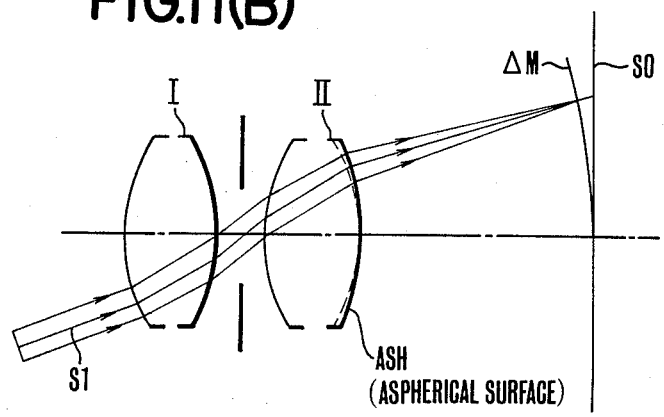
Figure 12A:
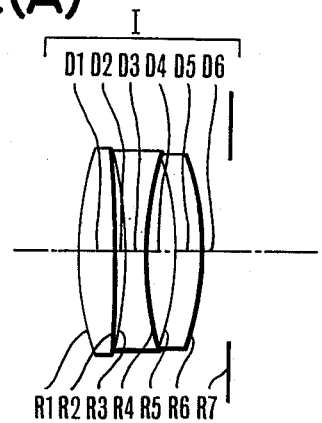
Figure 12B:
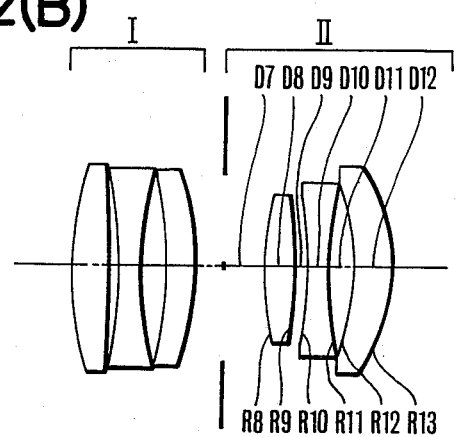
Figure 13A:
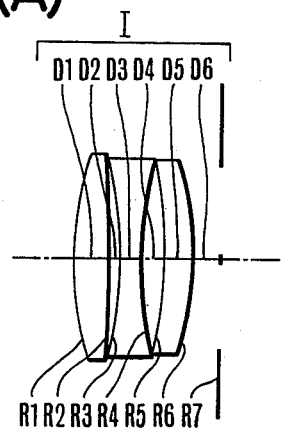
Figure 13B:
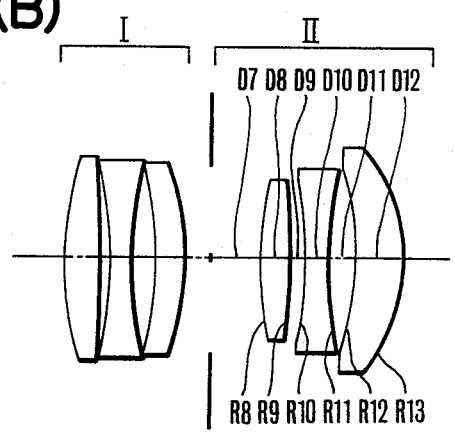
Figure 14A:
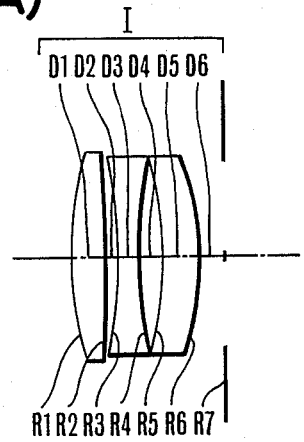
Figure 14B:
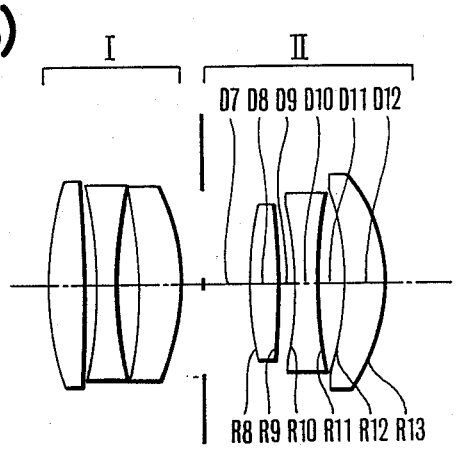
Figure 15A:
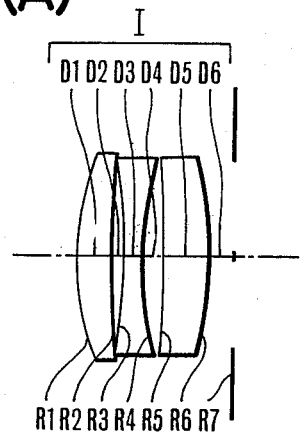
Figure 15B:
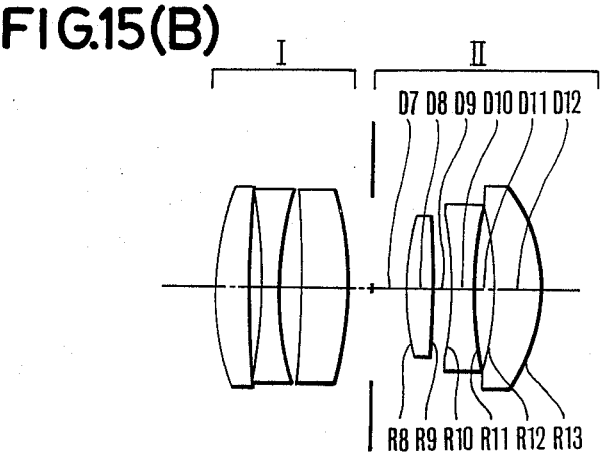
Figure 16A:
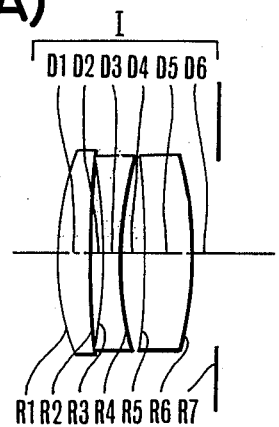
Figure 16B:
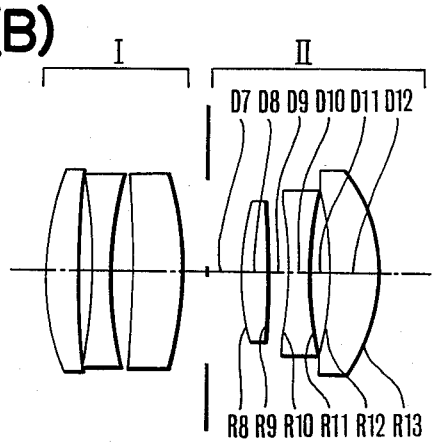
Figure 18A:
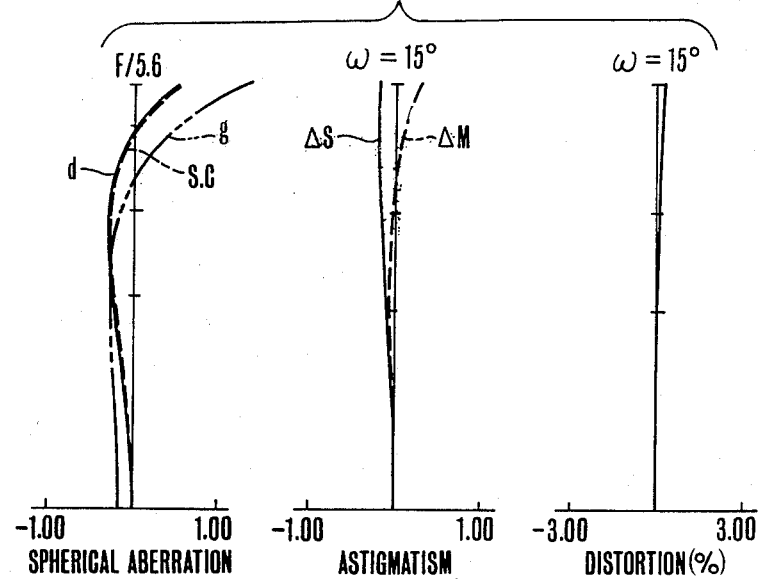
Figure 18B:
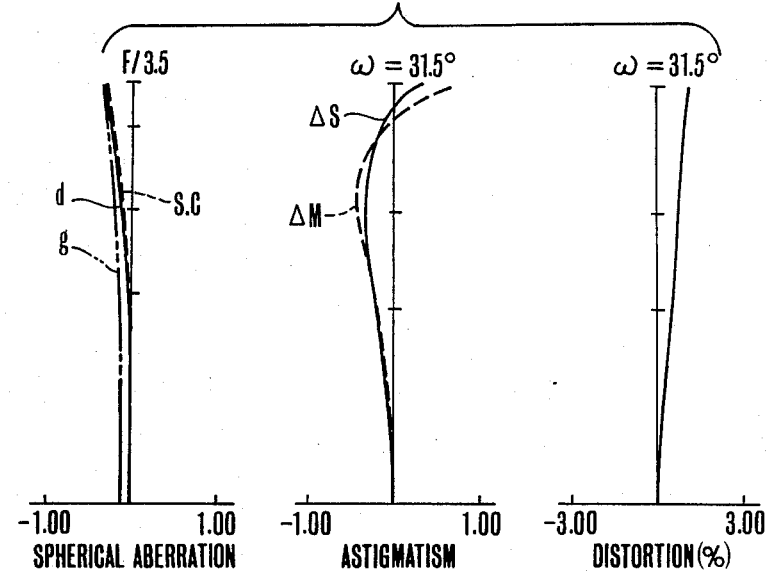
Figure 19A:
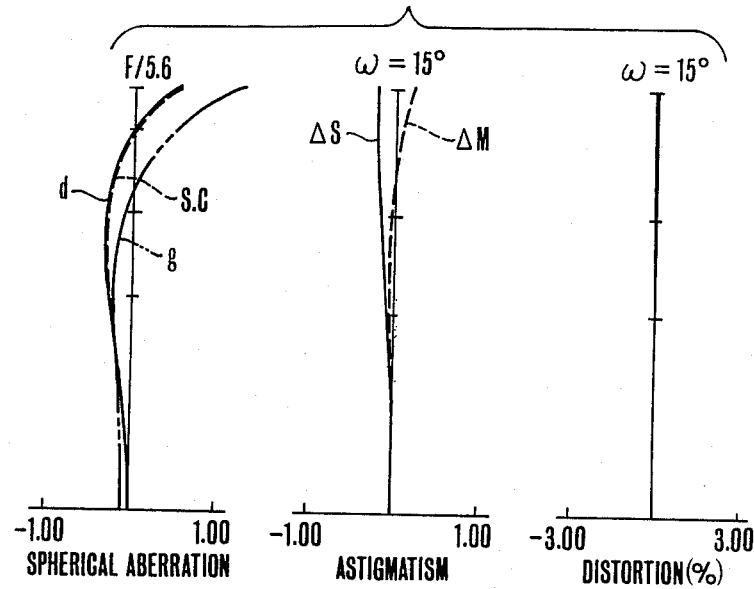
Figure 19B:
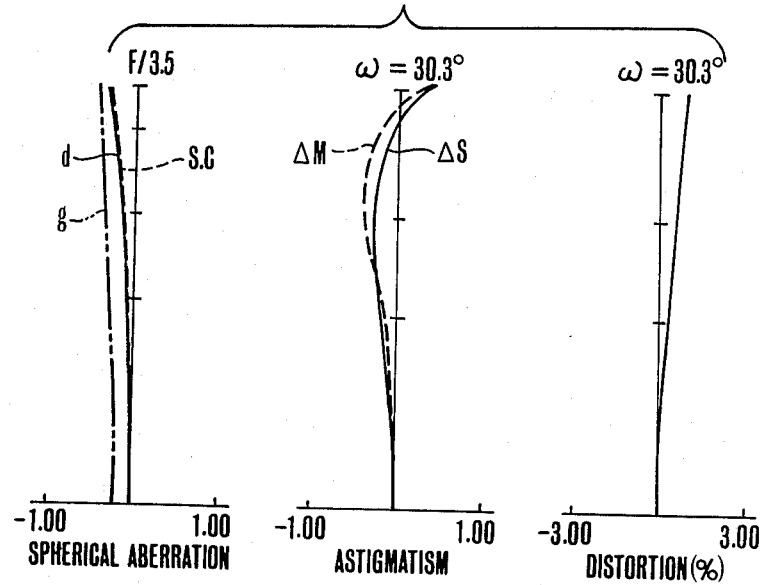
Figure 20A:
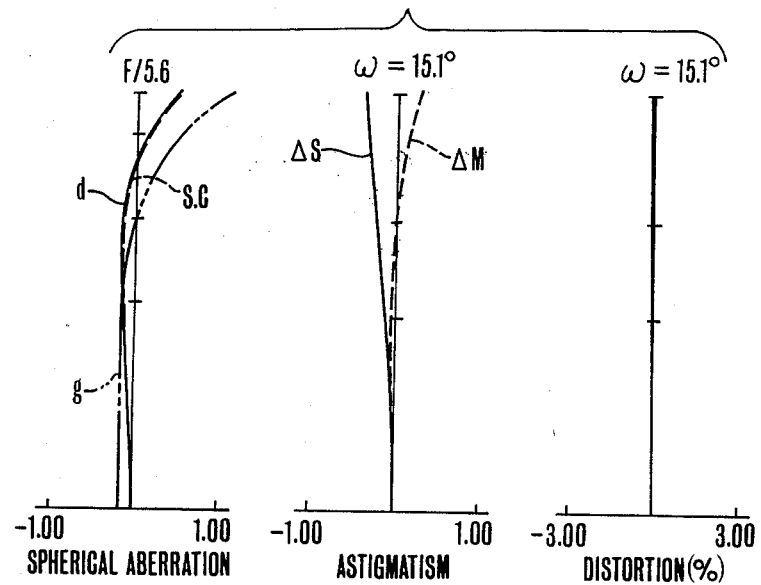
Figure 20B:
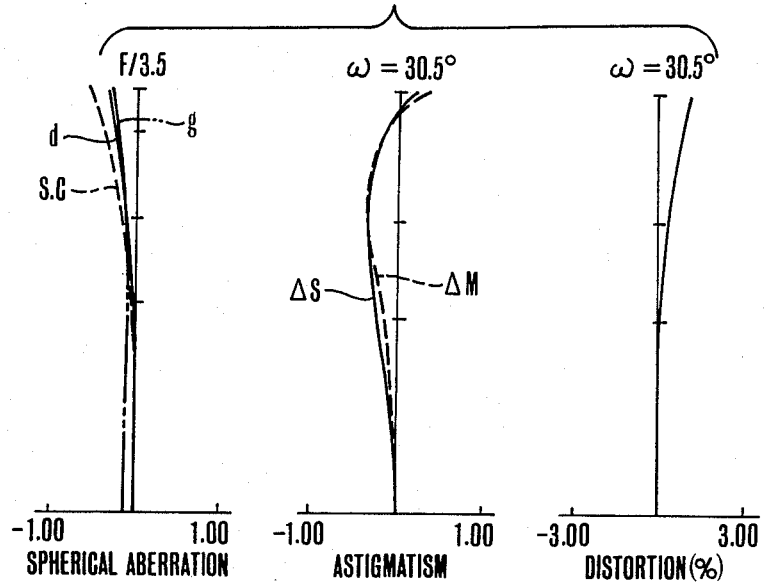
Figure 21A:
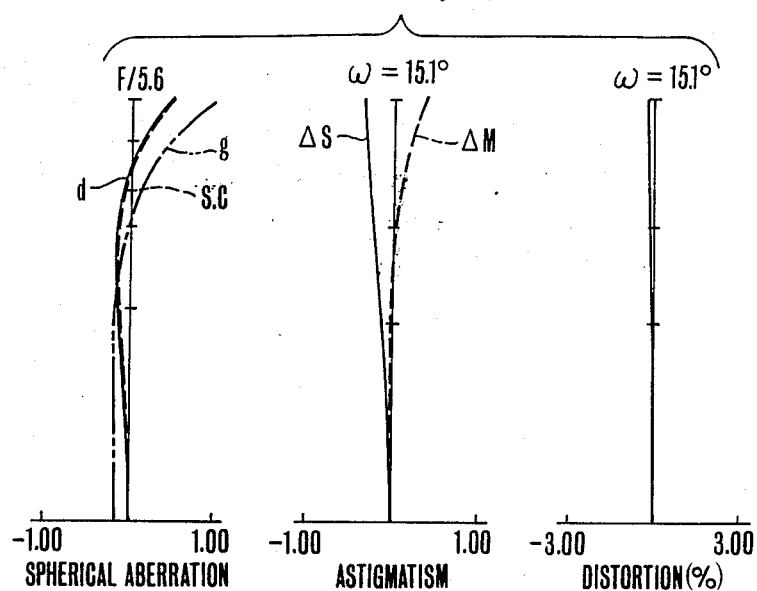
Figure 21B:
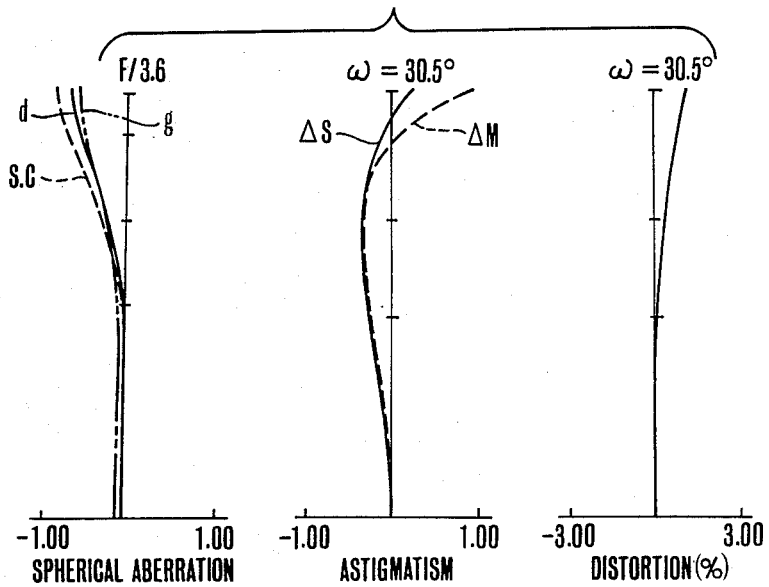

FIGS. 11(A) to 11(B) are schematic diagrams of the optical system with and without the aspherical surface taken to explain how the meridional image surface is changed. In these figures, the oblique pencil is shown, having a central ray $S_1$ and upper and lower marginal rays.

In FIG. 11(A), with no use of the aspherical surface as in the prior art, when the auxiliary lens is attached on the image side of the master lens assembly to change the image magnification, the meridional image surface is caused to curve largely away from an ideal image plane SO as indicated at $\Delta M$.

The optics of FIG. 11(B) represents the second embodiment of the invention wherein the curvature of the meridional image surface $\Delta M$ becomes far weaker than that shown in FIG. 11(A) when one of the lens surfaces in the auxiliary lens II is made an aspherical surface of such shape that the positive power weakens progressively as the height from the optical axis increases.

In other words, the oblique pencil is refracted to a smaller angle by the aspherical surface ASH in FIG. 11(B) than by the sphere SH in FIG. 11(A), bringing the meridional image surface closer to the ideal iamge plane SO.

It should be noted that as far as this embodiment is concerned, the aspherical surface when applied to any of the convex surfaces has to be configured in such a way that the radius of curvature increases toward the margin of the lens.

It is to be also noted that in this embodiment, too, the above-stated rules of design, or $$0.2 < f_2/f_1 < 0.71 \quad (1)$$

$$2.0 < f_1/F < 4.0 \quad (2)$$

are employed to produce the same advantages as those described in connection with the first embodiment.

Also, in this embodiment, to preserve the good correction of aberrations particularly in the marginal zone of the image format against the attachment of the auxiliary lens, this lens is constructed from a bi-convex first lens component of positive power in the form of a singlet or a cemented doublet, a bi-concave second lens component, and a meniscus-shaped third lens component of positive power convex toward the rear.

Further, in this embodiment, to balance out the aberrations of the master lens assembly alone and in combination with the auxiliary lens, the master lens assembly is constructed from a first lens component of positive power, a second lens component of negative power and a third lens component of positive power, the physical length $L_1$ or the distance from the front vertex of the first lens component to the rear vertex of the third lens component lying in the above-defined range (3), or the inequalities of conditions (4) and (5) being satisfied. These features enable the excellent imaging performance to be obtained as a matter of course.

The numerical data for the master lens assembly and the auxiliary lens are given in the following tables where the aspherical surface is figured in the co-ordinates with its X-axis in the optical axis and its H-axis in a direction perpendicular to the optical axis, the direction in which light advances being taken as positive, by the following equation:

$$X = \frac{(1/R) H^2}{1 + \sqrt{1 - (H/R)^2}} + a_1 H^2 + a_2 H^4 + a_3 H^6 + a_4 H^8 + a_5 H^{10}$$

where R is the radius of curvature of the osculating sphere, and $a_1$, $a_2$, $a_3$, $a_4$ and $a_5$ are the aspheric coefficients. Note, "D-OX" represents "$10^{-x}$".

Numerical Example 6

| | Master Lens Assembly + Auxiliary Lens $F = 35.35 \quad FNO = 1:4.0 \quad 2\omega = 62.90°$ | | |
|---|---|---|---|
| I | R1 = 22.78<br>R2 = −146.33<br>R3 = −35.68<br>R4 = 22.68<br>R5 = −27.00<br>R6 = −18.86<br>R7 = Stop | D1 = 2.82<br>D2 = 0.64<br>D3 = 1.56<br>D4 = 2.08<br>D5 = 2.41<br>D6 = 1.77<br>D7 = 3.19 | N1 = 1.80400 ν1 = 46.6<br>N2 = 1.62588 ν2 = 35.7<br>N3 = 1.77250 ν3 = 49.6 |
| II | R8 = 24.62<br>R9 = −51.93<br>R10 = −24.35<br>R11 = 30.29<br>R12 = −18.02<br>R13 = −12.85 | D8 = 2.23<br>D9 = 1.10<br>D10 = 1.46<br>D11 = 2.01<br>D12 = 3.01 | N4 = 1.83400 ν4 = 37.2<br>N5 = 1.72825 ν5 = 28.5<br>N6 = 1.77250 ν6 = 49.6 |

Aspheric Surface at $R_{13}$
$a_1$ = −6.259D-5   $a_2$ = 2.309D-5   $a_3$ = −2.831D-7
$a_4$ = 8.669D-9   $a_5$ = −5.575D-11
Master Lens Assembly:
$f_1$ = 82.3   FNO = 1:5.6   $2\omega$ = 29.50°
$f_2/f_1$ = 0.607   $L_1/f_1$ = 0.1155
$f_1/F$ = 2.328

Numerical Example 7

| | Master Lens Assembly + Auxiliary Lens $F = 35.3 \quad FNO = 1:3.5 \quad 2\omega = 63°$ | | |
|---|---|---|---|
| I | R1 = 22.47<br>R2 = −190.26<br>R3 = −36.30<br>R4 = 22.67<br>R5 = −27.71<br>R6 = −18.98<br>R7 = Stop<br>R8 = 24.47<br>R9 = −55.16<br>R10 = −23.66 | D1 = 2.83<br>D2 = 0.69<br>D3 = 1.45<br>D4 = 2.10<br>D5 = 2.34<br>D6 = 1.77<br>D7 = 3.52<br>D8 = 2.40<br>D9 = 1.17<br>D10 = 1.47 | N1 = 1.80400 ν1 = 46.6<br>N2 = 1.62588 ν2 = 35.7<br>N3 = 1.77250 ν3 = 49.6<br>N4 = 1.83400 ν4 = 37.2<br>N5 = 1.72825 ν5 = 28.5 |

-continued

|   | | | |
|---|---|---|---|
| II | R11 = 29.58 | D11 = 2.15 | |
|    | R12 = −21.43 | D12 = 3.39 | N6 = 1.77250 ν6 = 49.6 |
|    | R13 = −13.83 | | |

Aspheric Surface at $R_{13}$
$a_1 = -1.866\text{D-}4$  $a_2 = 2.179\text{D-}5$  $a_3 = -3.875\text{D-}7$
$a_4 = 8.474\text{D-}9$  $a_5 = -5.425\text{D-}11$
Master Lens Assembly:
$f_1 = 82.4$  FNO = 1:5.6  $2\omega = 29.40°$
$f_2/f_1 = 0.595$  $L_1/f_1 = 0.114$
$f_1/F = 2.333$

Numerical Example 8

Master Lens Assembly + Auxiliary Lens
F = 36.75  FNO = 1:3.5  $2\omega = 60.60°$

|   | | | |
|---|---|---|---|
| I | R1 = 23.53 | D1 = 2.86 | N1 = 1.77250 ν1 = 49.6 |
|   | R2 = −122.70 | D2 = 0.80 | |
|   | R3 = −33.25 | D3 = 1.40 | N2 = 1.62588 ν2 = 35.7 |
|   | R4 = 24.59 | D4 = 1.92 | |
|   | R5 = −28.26 | D5 = 3.03 | N3 = 1.81554 ν3 = 44.3 |
|   | R6 = −19.51 | D6 = 1.77 | |
|   | R7 = Stop | D7 = 3.34 | |
| II | R8 = 25.83 | D8 = 2.42 | N4 = 1.83400 ν4 = 37.2 |
|   | R9 = −51.61 | D9 = 1.18 | |
|   | R10 = −22.88 | D10 = 1.47 | N5 = 1.69895 ν5 = 30.1 |
|   | R11 = 29.28 | D11 = 2.18 | |
|   | R12 = −20.22 | D12 = 3.08 | N6 = 1.77250 ν6 = 49.6 |
|   | R13 = −14.42 | | |

Aspheric Surface at $R_{13}$
$a_1 = -1.638\text{D-}3$  $a_2 = 7.976\text{D-}6$  $a_3 = -4.953\text{D-}8$
$a_4 = 7.254\text{D-}10$  $a_5 = -5.631\text{D-}12$
Master Lens Assembly:
$f_1 = 81.6$  FNO = 1:5.6  $2\omega = 29.70°$ $f_2/f_1 = 0.667$  $L_1/f_1 = 0.123$
$f_1/F = 2.221$

Numerical Example 9

Master Lens Assembly + Auxiliary Lens
F = 36.77  FNO = 1:3.6  $2\omega = 60.90°$

|   | | | |
|---|---|---|---|
| I | R1 = 20.23 | D1 = 2.48 | N1 = 1.77250 ν1 = 49.6 |
|   | R2 = 78.71 | D2 = 0.89 | |
|   | R3 = −49.21 | D3 = 1.32 | N2 = 1.62004 ν2 = 36.3 |
|   | R4 = 23.47 | D4 = 1.74 | |
|   | R5 = −72.98 | D5 = 3.56 | N3 = 1.77250 ν3 = 49.6 |
|   | R6 = −25.46 | D6 = 1.77 | |
|   | R7 = Stop | D7 = 2.40 | |
| II | R8 = 21.92 | D8 = 2.10 | N4 = 1.83400 ν4 = 37.2 |
|   | R9 = −92.50 | D9 = 1.47 | |
|   | R10 = −25.32 | D10 = 1.43 | N5 = 1.71736 ν5 = 29.5 |
|   | R11 = 24.99 | D11 = 1.58 | |
|   | R12 = −23.41 | D12 = 3.66 | N6 = 1.69350 ν6 = 50.3 |
|   | R13 = −12.89 | | |

Aspheric Surface at $R_9$
$a_1 = -3.013\text{D-}3$  $a_2 = -2.207\text{D-}5$  $a_3 = 4.169\text{D-}7$
$a_4 = 2.947\text{D-}9$  $a_5 = -1.751\text{D-}10$
Master Lens Assembly:
$f_1 = 82.20$  FNO = 1:5.6  $2\omega = 30.20°$
$f_2/f_1 = 0.697$  $L_1/f_1 = 0.125$
$f_1/F = 2.18$

Numerical Example 10

Master Lens Assembly + Auxiliary Lens
F = 36.77  FNO = 1:3.6  $2\omega = 60.90°$

|   | | | |
|---|---|---|---|
| I | R1 = 20.35 | D1 = 2.44 | N1 = 1.77250 ν1 = 49.6 |
|   | R2 = 76.74 | D2 = 0.92 | |
|   | R3 = −49.13 | D3 = 1.29 | N2 = 1.62004 ν2 = 36.3 |
|   | R4 = 23.66 | D4 = 1.74 | |
|   | R5 = −75.67 | D5 = 3.88 | N3 = 1.77250 ν3 = 49.6 |

-continued

|   | | | |
|---|---|---|---|
|   | R6 = −25.57 | D6 = 1.77 | |
|   | R7 = Stop | D7 = 2.35 | |
| II | R8 = 20.03 | D8 = 2.10 | N4 = 1.83400 ν4 = 37.2 |
|   | R9 = −109.99 | D9 = 1.46 | |
|   | R10 = −23.34 | D10 = 1.41 | N5 = 1.71736 ν5 = 29.5 |
|   | R11 = 23.19 | D11 = 1.66 | |
|   | R12 = −24.39 | D12 = 3.63 | N6 = 1.69350 ν6 = 53.2 |
|   | R13 = −13.20 | | |

Aspheric Surface at $R_8$
$a_1 = -1.172\text{D-}3$  $a_2 = 1.403\text{D-}5$  $a_3 = 6.496\text{D-}7$
$a_4 = 5.932\text{D-}10$  $a_5 = -4.268\text{-D10}$
Master Lens Assembly:
$f_1 = 80.2$  FNO = 1:5.6  $2\omega = 30.20°$
$f_2/f_1 = 0.706$  $L_1/f_1 = 0.128$
$f_1/F = 2.18$ According to the present invention, by attaching to the image side of the master lens assembly an auxiliary lens having an aspheric surface of prescribed shape such that the positive refractive power weakens toward the margin of the lens, a changeover type variable magnification optical system of increased range of more than 2, while still permitting the size of the entire system to be minimized in such a manner that good stability of aberration correction is maintained against the change of the magnification can be achieved.

What is claimed is:

1. A changeover type variable magnification optical system comprising:
   a master lens assembly; and
   an auxiliary lens unit attached to said system on the image side of said master lens assembly, and satisfying the following condition:

$0.2 < f_2/f_1 < 0.71$ where $f_1$ and $f_2$ are the effective focal lengths of said master lens assembly and said auxiliary lens unit, respectively.

2. A changeover type variable magnification optical system comprising:
   a master lens assembly; and
   an auxiliary lens unit attached to said system on the image side of said master lens assembly, said auxiliary lens unit having a positive refractive power and comprising, from front to rear:
   a first lens component having a positive refractive power and having a lens surface convex on the object side of said master lens assembly;
   a second lens component having two concave lens surfaces; and
   a third lens component having a positive refractive power, having a meniscus shape, and having its convex side facing the image side of said master lens assembly, and wherein at least one of the lens surfaces of said auxiliary lens unit is an aspherical surface.

3. A system according to claim 2, satisfying the following conditions:

$0.2 < f_2/f_1 < 0.71$ where $f_1$ and $f_2$ are the focal lengths of said master lens unit, assembly and said auxiliary lens, respectively.

4. A system according to claim 3, satisfying the following condition:

$2.0 < f_1/F < 4.0$ where F is the overall focal length of said master lens assembly and said auxiliary lens unit.

5. A changeover type variable magnification optical system, comprising:
- a master lens assembly having at least one positive lens and at least one negative lens; and
- an auxiliary lens unit attached to said system on the image side of said master lens assembly, and satisfying the following conditions:

$$0.2 < f_2/f_1 < 0.71$$

$$N_p > 1.7$$

$$N_n < 1.7$$

where $f_1$ and $f_2$ are the effective focal lengths of said master lens assembly and said auxiliary lens unit, respectively, $N_p$ is the refractive index of said positive lens, and $N_n$ is the refractive index of said negative lens.

6. A system according to claim 5, satisfying the following condition:

$$2.0 < f_1/F < 4.0$$

where F is the focal length when said auxiliary lens unit is attached to said master lens assembly.

7. A system according to claim 5, wherein said master lens assembly includes, from front to rear, a first lens component having a positive power, a second lens component having a negative power, and a third lens component having a positive power.

8. A system according to claim 7, wherein said third lens component is a cemented doublet of a lens of negative power and a lens of positive power.

9. A system according to claim 7, satisfying the following condition:

$$0.1 < L_1/f_1 < 0.24$$

where $L_1$ is the length from the object side surface of said first lens component to the image side surface of said third lens component.

* * * * *

UNITED STATES PATENT AND TRADEMARK OFFICE
CERTIFICATE OF CORRECTION

PATENT NO. : 4,830,474          Page 1 of 2
DATED      : May 16, 1989
INVENTOR(S): Nakayama, et al.

It is certified that error appears in the above-identified patent and that said Letters Patent is hereby corrected as shown below:

AT [57] (ABSTRACT)

Line 5, change "following" to --the following--.

Line 9, change "include of" to --to include--.

COLUMN 1

Line 12, change "increasing the" to --increasing of the--.

Line 52, delete "of" (second occurrence).

COLUMN 3

Line 14, change "lengtn" to --length--.

Line 40, change "enequalities" to --inequalities--.

COLUMN 6

Line 65, change "lens II" to --lenses II--.

COLUMN 7

Line 47, change "iamge" to --image--.

UNITED STATES PATENT AND TRADEMARK OFFICE
CERTIFICATE OF CORRECTION

PATENT NO. : 4,830,474

DATED : May 16, 1989

INVENTOR(S) : Nakayama, et al.

Page 2 of 2

It is certified that error appears in the above-identified patent and that said Letters Patent is hereby corrected as shown below:

<u>COLUMN 10</u>

Line 63, delete "unit,"; and change "auxiliary lens" to --auxiliary lens unit--.

Signed and Sealed this

Twenty-seventh Day of February, 1990

Attest:

JEFFREY M. SAMUELS

*Attesting Officer*  *Acting Commissioner of Patents and Trademarks*